United States Patent [19]
Uchida

[11] 3,901,518
[45] Aug. 26, 1975

[54] DUST SEAL COVER FOR BALL JOINT

[75] Inventor: Yasuo Uchida, Hamamatsu, Japan

[73] Assignee: Ishikawa Tekko Kabushiki Kaisha, Tokyo, Japan

[22] Filed: Aug. 26, 1974

[21] Appl. No.: 500,611

[30] Foreign Application Priority Data
Sept. 25, 1973   Japan............................. 48-107782

[52] U.S. Cl............................ 277/212 FB; 403/134
[51] Int. Cl.² .......................................... F16C 11/06
[58] Field of Search...................... 403/50, 51, 134; 277/212 FB; 74/18.1

[56] References Cited
UNITED STATES PATENTS

| | | | |
|---|---|---|---|
| 3,175,834 | 3/1965 | Wallace et al. | 277/212 FR |
| 3,262,706 | 7/1966 | Hassan | 403/134 X |
| 3,322,445 | 5/1967 | Hassan | 277/212 FB |
| 3,403,932 | 10/1968 | Kutcher | 403/51 |

Primary Examiner—Andrew V. Kundrat
Attorney, Agent, or Firm—James E. Nilles

[57] ABSTRACT

Dust seal cover for a ball joint comprises a generally cylindrical cover body of a gum material having an opening at one end thereof, said opening being of a slightly smaller diameter than that of the socket portion at which said cover body is to be mounted. A ring of resilient material is embedded in the peripheral edge portion of said opening so that the socket portion may be resiliently clamped by the ring. A tapered inner wall portion is formed adjacent to the above peripheral edge portion to sealingly enclose the socket portion when the cover body is mounted on the socket of the ball joint.

2 Claims, 3 Drawing Figures

DUST SEAL COVER FOR BALL JOINT

BACKGROUND OF THE INVENTION

The present invention relates to a dust seal cover for a ball joint used in a connecting portion of a link mechanism of a suspender, steering apparatus or the like for automobiles or cars.

An object of the invention is to provide a dust seal cover which can be mounted easily, reliably and securedly to the socket of the ball joint with sealing effect attained simultaneously, said dust seal cover being insusceptible to damage at the time of mounting thereof and throughout the used period, whereby lengthened life time is assured.

The above and other objects as well as novel features and advantages of the invention will become apparent from the following description of a preferred embodiment of the invention. The description makes reference to the drawing.

DETAILED DESCRIPTION OF THE PREFERRED EMBODIMENT

Figure 1:
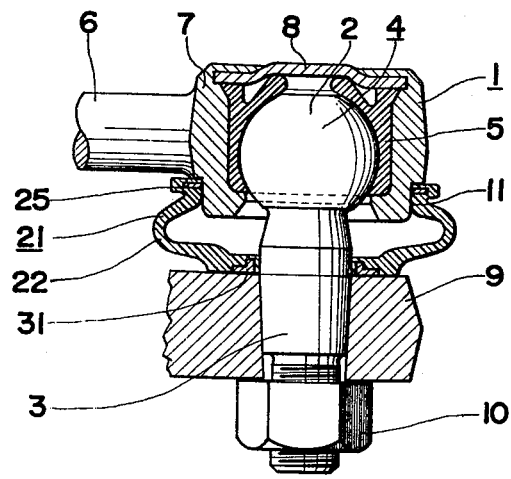
FIG. 1 is a partially sectioned elevational view of a ball joint provided with a dust seal cover according to the invention.

Referring to FIG. 1, reference numeral 1 indicates a ball joint for a steering rod. In general, this type of the ball joint 1 comprises a ball stud 4 having a spherical head 2 and a shank 3 extending from the head 2 for connection to other member, a socket 7 adapted to support a bearing member 5 and having a shank 6 for connection to other member, and a closing member 8 for closing sealingly the socket 7 to thereby hold the bearing member 5 within the socket 7. It will be noted that the bearing member 5 serves to slidably hold the spherical head 2. Further, the shank 3 of the ball stud 4 is connected to a knuckle arm 9 by means of a key and fixedly secured to the arm 9 through a nut 10.

The socket 7 has a dust seal cover mounting portion 11. Disposed compressed to some degree between the cover mounting portion 11 and the shank 3 of the ball stud 4 is a dust seal cover 21 according to the present invention which is subjected to extension and contraction in response to the relative movements between the socket 7 and the ball stud 4.

Figure 2:
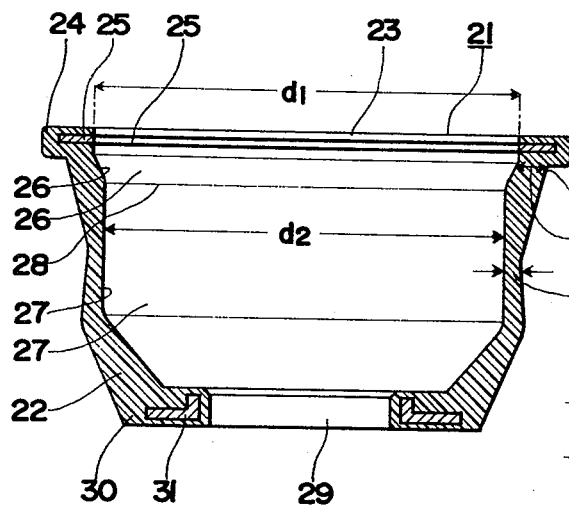
FIG. 2 is a vertical sectional view of a dust seal cover according to the invention.

FIG. 2 shows the dust seal cover 21 according to the present invention in the state dismounted from the ball joint. The cover 21 has a substantially cylindrical cover body 22 of a rubber material, which body has a large opening 23 of an inner diameter ($d_1$) slightly smaller than the outer diameter of the cover mounting portion 11 of the socket 7. Formed along the periphery of the large opening 23, flaring outwardly in a form of a flange, is a peripheral edge 24 in which a rigid resilient ring 25 formed of a sheet metal is embedded fixedly by heat fusion. If necessary, the resilient ring 25 may be splitted at one portion.

Formed contiguously to the large opening portion 23 of the cover body 22 by way of a tapered portion 26 having an inner surface converging inwardly is an intermediate wall 27 of a generally cylindrical configuration having an inner diameter ($d_2$) smaller than the inner diameter ($d_1$) of the large opening portion 23. The lower end portion of the intermediate wall 27 is tapered inwardly to form a small opening 29 at the other end of the cover body 22. Peripheral edge portion 30 of the small opening 29 has an annular rigid ring 31 of a hardened plastic material or metal embedded therein integrally by heating, said ring 31 being of an L-shaped cross-section.

The cover body 22 has a first thin wall portion ($t_1$) at the substantially mid portion thereof, from which thin portion ($t_1$) the wall thickness of the cover body is increased progressively upwardly and downwardly to provide generally a boot-like configuration between the peripheral edge portion 24 of the large opening 23 and the peripheral edge portion 30 of the small opening 29. It is to be noted that the increase in the wall thickness in the upper direction terminates at the lip portion 28 and thereafter the wall thickness is decreased progressively until the peripheral edge portion 24 has been attained. In other words, arrangement is made such that the junction 32 between the peripheral edge portion 24 and the boot-like enclosure substantially coincides with the starting point of the tapered portion 26, whereby a second thin wall portion ($t_2$) is formed between the peripheral edge portion 24 and the lip portion 28.

When mounting the dust cover seal 21 on the ball joint, the cover body is press-fitted to the socket 7 with the large opening 23 encircling the outer periphery of the socket 7. Because the inner diameter ($d_1$) of the large opening 23 of the cover body 22 is slightly smaller than the diameter of the mounting portion 11 of the socket 7, the peripheral edge defining the large opening 23 as well as the resilient ring 25 are correspondingly expanded upon the mounting, whereby the outer surface of the mounting portion 11 is resiliently clamped by the ring 25. In this connection, it should be appreciated that an annular groove may be formed, if necessary, around the mounting portion 11 of the socket 7 at the position to be engaged by the resilient ring 25. The annular lip portion 28 is also expanded outwardly when mounted on the socket 7, since the inner diameter ($d_2$) of the lip portion 28 is smaller than the outer diameter of the cover mounting portion 11 of the socket 7, as a result of which the lip portion 28 is press-fitted around the outer surface of the socket 7 due to the resiliency of the cover body 22. As hereinbefore described, the inner surface of the portion 26 is slanted at the lip portion 28 with an angle $\theta$ relative to the intermediate wall portion 27, as is clearly illustrated in FIG. 3. Because the wall is made thicker at the lip portion 28, the lip angle $\theta$ will tend to remain substantially unchanged, even if the lip portion 28 is expanded outwardly upon being mounted on the socket 7. As a result of that, the wall of the cover body including the intermediate wall portion 27 is bent outwardly about the junction 32 lying between the peripheral edge portion 24 and the boot-like enclosure with the tapered inner wall 26 sealingly contacting the outer surface of the cover mounting portion 11.

Figure 3:
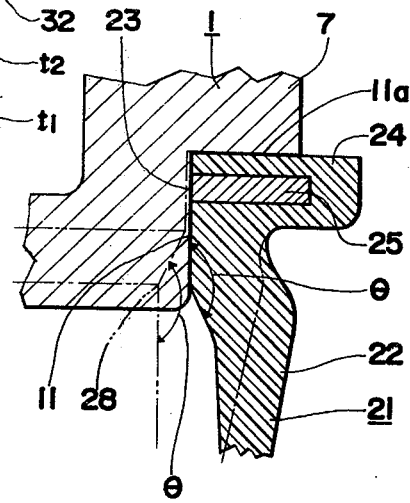
FIG. 3 is an enlarged fragmental sectional view to illustrate the state of the dust seal cover of the invention mounted on the ball joint.

In FIG. 3, phantom line indicates the state of the cover body 22 before it is deformed as above described. Such deformation of the wall of the cover body 22 in the vicinity of the lip portion 28 is allowed due to the fact that the relatively thin wall portions are provided above and below the lip portion 28. In this manner, the lip portion 28 provides a good sealing action to prevent lubrication medium within the ball joint from leaking and at the same time prevent moisture and dusts from invading the interior of the covered ball joint. As above mentioned, the intermediate wall portion 27 adjacent to the lip portion 28 is bulged outwardly, so that it may remain intact from interference of the lower end portion of the socket 7 when the intermediate wall portion 27 is moved following to the swinging movement of the shank 3 of the ball stud 4.

The rigid resilient ring 25 may be made of various materials and may have various configurations, so far as the above described function can be obtained. For example, the ring may be a nylon ring of a plate-like cross-section, a ring of steel wire spring, or a ring in a form of dish spring. It will be appreciated that the peripheral portion 24 of the cover body 22 fittingly sandwitched between the resilient ring 25 and the shoulder 11a of the socket 7 serves to prevent the invasion of moisture and dusts from the exterior.

Further, the rigid ring 31 embedded integrally in the peripheral edge portion 30 of the small opening 29 provides resistance to the tendency of the small opening 29 being elliptically deformed due to the swinging movement of the shank 3 of the ball stud 4, and additionally prevents the bending of the peripheral edge portion 30 inwardly toward the ball joint 1. The rigid ring 31 may be formed of a suitable synthetic resin material or metal.

As is apparent from the foregoing description, the dust seal cover according to the invention can be mounted onto the ball joint simply by a single operation of press-fitting. Since the resilient ring is previously embedded in the cover body of gum material, the possibility of the latter being damaged upon mounting is excluded. Besides, the cover body is evaded from the frictional contact with the socket and the resilient ring in use, so that wearing and fatigue of the cover body is minimized, which in turn allows a lengthened life of the cover. Moreover, the boot-like configuration having substantially smoothed inner surface will facilitate the forming of the gum cover.

While the invention has been described with reference to a preferred embodiment of the invention, it should be appreciated to those skilled in the art that the invention will never be restricted to the described and illustrated embodiment and many modifications as well as changes in design may be made without departing from the scope and spirit of the invention.

What is claimed is:

1. Dust seal cover adapted to be mounted on an outer surface of a socket of a ball joint, comprising a generally cylindrical cover body (22) of a resilient material formed with a large opening (23) at one end thereof having an inner diameter ($d_1$) slightly smaller than the outer diameter of a cover mounting portion (11) of said socket (7), a rigid resilient ring (25) integrally embedded in a radially outwardly extending peripheral edge flange portion (24) at said large opening (23) and having a smaller inner diameter than the outer diameter of said cover mounting portion (11) of said socket (7), a generally cylindrical inner wall portion (27) formed in said cover body (22) connected to said large opening (23) by way of an inwardly tapered inner wall portion (26) so that said cylindrical inner wall portion has an inner diameter ($d_2$) smaller than that of said large diameter ($d_1$), a portion of said cylindrical inner wall portion (27) located opposite to said tapered inner wall portion (26) being converged inwardly and connected to a small opening (29) formed in said cover body (22) at the other end thereof, the junction (32) between the radially outwardly extending peripheral edge flange portion (24) and the cover body (22) lying on a plane containing one end of the tapered inner wall portion (26), and an annular lip edge portion (28) formed inside said cover body (22) at a position in a plane containing the junction between the other end of said inwardly tapered inner wall portion (26) and said cylindrical inner wall portion (27), the inner peripheral surface of said small opening (29) being sealingly and slidably contacted with the outer peripheral surface of a shank (3) of a ball stud (4), the outer surface of the peripheral surface of the peripheral edge (30) of said small opening (29) being sealingly and slidably contacted with the outer surface of a mounting member (9), wherein, upon mounting said cover body (22), said mounting portion (11) of said socket (7) is resiliently clamped by said radially outwardly extending peripheral edge flange portion (24) of said large opening (23) under the influence of said rigid resilient ring (25), while said annular lip edge portion (28) adjacent to said large opening (23) is sealingly pressed against the outer surface of said cover mounting portion (11) of said socket (7).

2. Dust seal cover for a ball joint as set forth in claim 1, wherein said cover body (22) has a first thin wall portion ($t_1$) at a substantially mid point thereof, from which point the wall thickness is progressively increased toward said radially outwardly extending peripheral edge flange portion (24) of said large opening (23) and said peripheral edge portion (30) of said small opening (24), the increase in the wall thickness toward said radially outwardly extending peripheral edge flange portion (24) of said large opening (23) attaining a maximum at said lip edge portion (28) and thereafter the wall thickness being decreased progressively to form a second thin wall portion ($t_2$) between said radially outwardly extending peripheral edge flange portion (24) and said lip edge portion (28).

* * * * *